United States Patent
Elbick et al.

(10) Patent No.: US 9,222,189 B2
(45) Date of Patent: Dec. 29, 2015

(54) METHOD FOR THE POST-TREATMENT OF METAL LAYERS

(75) Inventors: Danica Elbick, Solingen (DE); Ulrich Prinz, Solingen (DE); Andreas Konigshofen, Leverkusen (DE); Markus Dahlhaus, Schermbeck (DE)

(73) Assignee: Enthone Inc., West Haven, CT (US)

(*) Notice: Subject to any disclaimer, the term of this patent is extended or adjusted under 35 U.S.C. 154(b) by 595 days.

(21) Appl. No.: 13/129,300

(22) PCT Filed: Nov. 13, 2009

(86) PCT No.: PCT/US2009/064394
§ 371 (c)(1),
(2), (4) Date: Jul. 25, 2011

(87) PCT Pub. No.: WO2010/057001
PCT Pub. Date: May 20, 2010

(65) Prior Publication Data
US 2011/0272284 A1   Nov. 10, 2011

(30) Foreign Application Priority Data

Nov. 14, 2008 (EP) ...................................... 08019899
Feb. 19, 2009 (EP) ...................................... 09002335

(51) Int. Cl.
*C25D 9/04* (2006.01)
*C09D 5/08* (2006.01)
(Continued)

(52) U.S. Cl.
CPC .. *C25D 9/04* (2013.01); *C09D 5/08* (2013.01); *C09D 5/4411* (2013.01);
(Continued)

(58) Field of Classification Search
CPC ........................................... C09D 5/44–5/4496
USPC ......................................................... 205/317
See application file for complete search history.

(56) References Cited

U.S. PATENT DOCUMENTS

| | | |
|---|---|---|
| 2,377,792 A | 6/1945 | Lawrence et al. |
| 3,350,285 A | 10/1967 | Nishigaki et al. |

(Continued)

FOREIGN PATENT DOCUMENTS

| | | |
|---|---|---|
| EP | 1369502 A1 | 12/2003 |
| EP | 1712300 A1 | 10/2006 |

(Continued)

OTHER PUBLICATIONS

F. A. Lowenheim, Electroplating, McGraw-Hill Book Company, New York, 1978, pp. 12-24.*

(Continued)

*Primary Examiner* — James Lin
*Assistant Examiner* — Ho-Sung Chung
(74) *Attorney, Agent, or Firm* — Senniger Powers LLP

(57) ABSTRACT

A process for treating the surface of a metal substrate comprising a constituent metal selected from the group consisting of Cr, Cu, Mn, Mo, Ag, Au, Pt, Pd, Rh, Pb, Sn, Ni, Zn, in some cases Fe, and alloys of these metals. An anodic potential is applied to the metal surface in an electrolytic circuit comprising the metal surface, a cathode, and an electrolytic solution that is in contact with the metal surface and in electrically conductive communication with the cathode. The electrolytic solution may contain an electrolyte comprising anions of phosphate, phosphonate, phosphite, phosphinate, nitrate, borate, silicate, molybdate, tungstate, carboxylate, oxalate and combinations thereof. The anion may comprise a polymer having a pendent moiety selected from the group consisting of phosphate, phosphonate, phosphite, phosphinate, sulfate, sulfonate, carboxylate and combinations thereof. The potential applied to the circuit is such that the substrate is anodically oxidized and reacts with the anion to form a composition that imparts an enhanced property to the metal surface. Preferably, the pH of the electrolytic solution is less than about 6.0, the potential applied is between about 0.5 and about 20 volts, and the current density is between about 0.01 and 2 amps/$dm^2$ of the geometric surface area of metal in contact with the electrolytic solution and is controlled such that nascent cations of said constituent metal produced by anodic oxidation of said constituent metal react with said anions at the metal surface without significant formation of any oxide or hydroxide of said constituent metal.

50 Claims, 1 Drawing Sheet

(51) Int. Cl.

| | |
|---|---|
| *C09D 5/44* | (2006.01) |
| *C25D 5/48* | (2006.01) |
| *C25D 11/02* | (2006.01) |
| *C25D 11/26* | (2006.01) |
| *C25D 11/34* | (2006.01) |
| *C25D 11/36* | (2006.01) |
| *C25D 11/38* | (2006.01) |

(52) U.S. Cl.
CPC .............. *C09D 5/4484* (2013.01); *C25D 5/48* (2013.01); *C25D 11/02* (2013.01); *C25D 11/26* (2013.01); *C25D 11/34* (2013.01); *C25D 11/36* (2013.01); *C25D 11/38* (2013.01)

(56) References Cited

U.S. PATENT DOCUMENTS

| | | | |
|---|---|---|---|
| 3,382,165 | A | 5/1968 | Gilchrist |
| 3,437,574 | A | 4/1969 | Ryuichi, et al. |
| 4,383,897 | A * | 5/1983 | Gillich et al. ................. 101/459 |
| 4,520,077 | A * | 5/1985 | Lavezzari ..................... 428/632 |
| 6,004,448 | A * | 12/1999 | Martyak ....................... 205/178 |
| 6,020,030 | A | 2/2000 | Guthrie et al. |
| 6,030,710 | A | 2/2000 | Nitowski et al. |
| 6,149,794 | A | 11/2000 | Heimann et al. |
| 6,328,874 | B1 * | 12/2001 | Kinlen et al. ................. 205/317 |
| 6,696,106 | B1 | 2/2004 | Schultz et al. |
| 6,866,944 | B2 | 3/2005 | Nakazawa et al. |
| 7,655,279 | B2 | 2/2010 | Dietsche et al. |
| 2002/0104761 | A1 | 8/2002 | Birss et al. |
| 2008/0210570 | A1 | 9/2008 | Schuster et al. |

FOREIGN PATENT DOCUMENTS

| | | |
|---|---|---|
| EP | 1712390 A1 | 10/2006 |
| FR | 1592078 A | 5/1970 |
| GB | 1135406 A | 12/1968 |
| JP | 2005232529 | 9/2005 |
| WO | 2008072617 | 6/2008 |

OTHER PUBLICATIONS

Abstract of WO2008072617; Jun. 19, 2008.
International Search Report, PCT/US2009/064394, dated Jul. 2, 2010, 4 pages.
Written Opinion, PCT/US2009/064394, dated Jul. 2, 2010, 7 pages.
Rammelt et al., "Improvement of Protection Performance of Polypyrrole by dopant anions", Journal of Applied Electrochemistry, Dec. 2005, vol. 35; No. 12, pp. 1225-1230.
International Preliminary Report on Patentability, PCT/US2009/064394, dated May 26, 2011, 7 pages.
International Search Report, PCT/US2009/038348, dated Sep. 23, 2009, 9 pages.
Written Opinion, PCT/US2009/038348, dated Sep. 23, 2009, 8 pages.
International Preliminary Report on Patentability, PCT/US2009/038348, dated May 17, 2011, 8 pages.

* cited by examiner

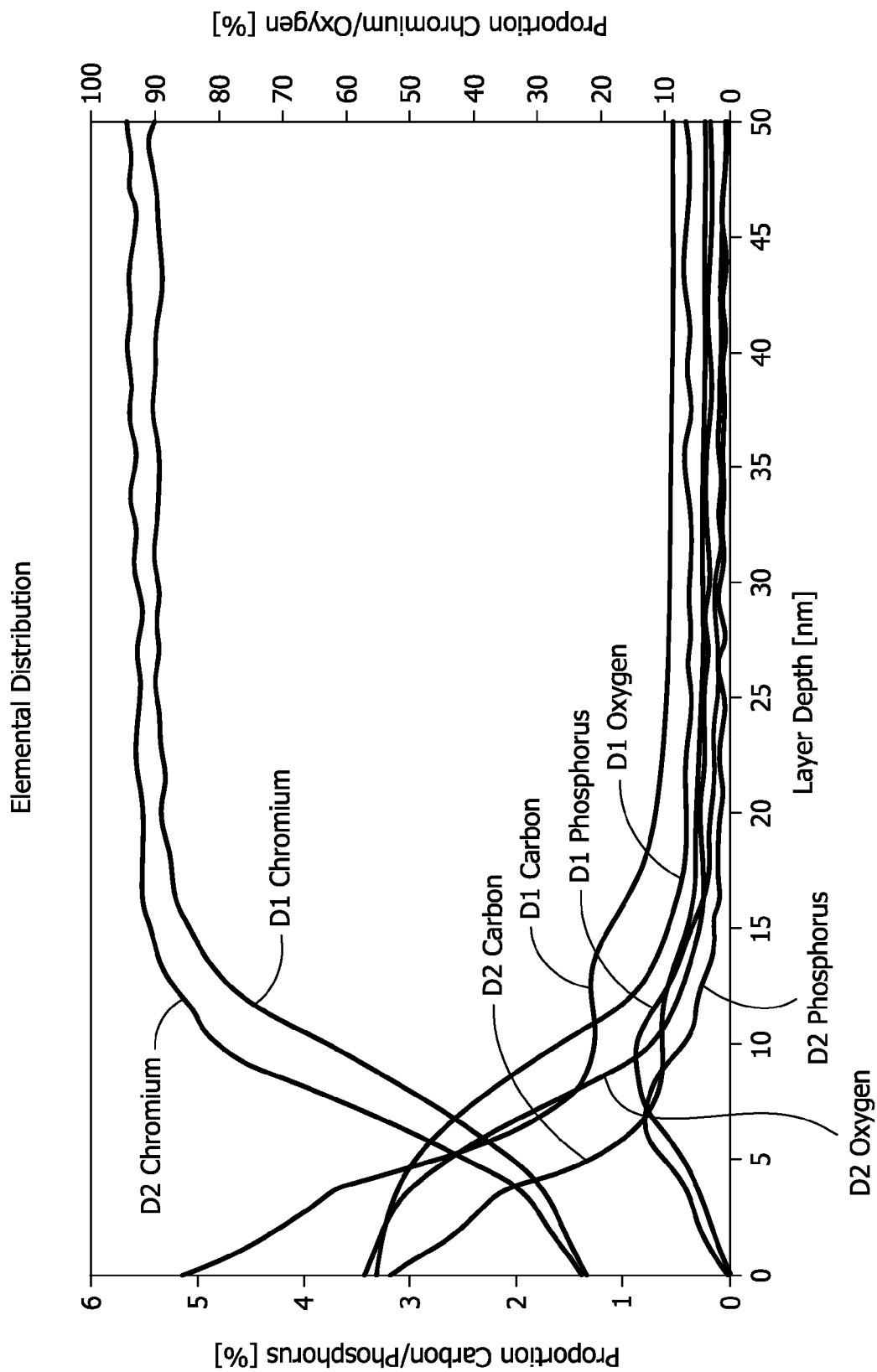

METHOD FOR THE POST-TREATMENT OF METAL LAYERS

REFERENCE TO RELATED APPLICATIONS

This application is a U.S. national stage application of International Patent Application No. PCT/US2009/064394, filed Nov. 13, 2009, and claims the benefit of European Application No. 08019899.7, filed Nov. 14, 2008, and European Application No. 09002335.9, filed Feb. 19, 2009, the entire disclosures of which are incorporated herein by reference.

This invention relates to a method for the electrolytic treatment of metal substrates, especially for the post-treatment of metal layers deposited on the surface of a substrate.

It is well-known in the art of surface technology to post-treat metal layers deposited on a substrate surface, either by galvanic deposition, autocatalytic deposition or other methods like PVD or CVD, to adjust the surface characteristics or features. One of the main features intended to increase is the corrosion resistance of the surface layer.

For example, European patent application EP 1 712 390 discloses the coating of metal surfaces with corrosion inhibiting polymer layers. Here, the surface is contacted with a solution comprising a polyvinyl phosphonic acid or polyacrylic acid prior to a treatment of the surface with a solution comprising monomeric or polymeric resins or a mixture of monomeric and polymeric resins.

U.S. Pat. No. 6,030,710 discloses aluminium alloy sheets which are provided with the primer layer comprising a reaction product of aluminium oxide or hydroxide and a polyvinyl phosphonic acid/polyacrylic acid copolymer, which primer layer is coated with the polymer coating composition containing polyvinyl chloride or an epoxy.

U.S. Pat. No. 6,696,106 B1 discloses a primer for radiation cureable coating compositions. Here, an aluminium-polymer composite is made by coating a surface portion of an aluminium alloy body with the primer composition comprising a polyvinyl phosphonic acid/polyacrylic acid copolymer to form a primer layer, coating the primer layer with the radiation cureable polymer precursor, and irradiating the polymer precursor with ultraviolet or electron dim radiation.

U.S. Pat. No. 6,020,030 also discloses the pre-treatment of aluminium alloy substrates with an aqueous solution containing an organophosphorous compound, preferably a polyvinyl phosphonic acid/polyacrylic acid copolymer, before coating the substrate with the polymer.

WO 2004/074372 A1 discloses a composition for treating surfaces, said composition containing copolymer as component A comprising in (meth)acrylic acid or the salts thereof, a monomer containing carboxylate and/or monomers comprising groups containing phosphoric acid and/or phosphonic acid or the salts thereof and optionally additional comonomeres. Furthermore, a passivation layer is disclosed, which contains the component A and is applied to a metallic surface.

While the methods known from the state of the art to post-treat metal layers are more or less capable to increase the corrosion resistance of the metal layers, some of the environmental or application depending influences are so aggressive that layers, also when treated according to the state of the art, cannot restrain from corrosion.

Amongst others, the chloride induced corrosion of chromium surfaces caused by deicing salts has been a major topic for several years in the field of automotive. Also, the so called red-rust on chromium surfaces that have been plated with trivalent chromium electrolytes is a problem known from the state of the art.

In another field of application, the fitting industry, Pb-leaching of brass parts for drinking water pipe applications is known to be a problem. The Pb-leaching should be minimised by passivation of the brass metal.

In the art of decorative coatings, there are intentions to reduce the sensitivity of the surface against fingerprints. To do so, it is known from the state of the art to incorporate polymeric components into a metal layer deposited on the surface, like for example polytetrafluoroethylene particles.

A drawback of the methods known from the state of the art is that the surfaces still showing some corrosive reactions or that the post-treatment layers increasing the corrosion resistance are not adhered enough to the surface to enable long term corrosion resistance.

SUMMARY OF THE INVENTION

It is therefore the object of this invention to provide a method which is capable of enhancing a property of a metal substrate, most particularly the corrosion resistance of metal layers deposited on the surface of substrates.

To do so, the invention proposes a method for the post-treatment of a metal layer deposited on the surface of a substrate, wherein the metal layer after deposition is brought into contact with a corrosion resistant increasing solution, which method is characterised in that during the contacting of the metal layer with the corrosion resistance increasing solution a current is applied between the surface of the metal layer and a counter electrode, whereby the metal layer is anodic contacted and the counter electrode is cathodic contacted.

The invention is further directed to a process for treating the surface of a non-ferrous metal substrate comprising a constituent metal selected from the group consisting of Cr, Cu, Mn, Mo, Ag, Au, Pt, Pd, Rh, Pb, Sn, Ni, Zn and alloys thereof. An anodic potential is applied to the metal surface in an electrolytic circuit comprising the metal surface, a cathode, and an aqueous electrolytic solution in contact with the metal surface and in electrically conductive communication with the cathode. The electrolytic solution contains an electrolyte comprising anions selected from the group consisting of phosphate, phosphonate, phosphite, phosphinate, nitrate, borate, silicate, molybdate, tungstate, carboxylate, oxalate and combinations thereof. The potential applied to the circuit is such that a constituent metal of the metal substrate is anodically oxidized and reacts with the anion to form a composition at the surface that imparts an enhanced property to the surface.

The invention is still further direct to a process for treating the surface of a metal substrate comprising a constituent metal selected from the group consisting of Cr, Cu, Mn, Mo, Ag, Au, Pt, Pd, Rh, Pb, Sn, Ni, Fe, Zn and alloys thereof. An anodic potential is applied to the metal surface in an electrolytic circuit comprising the metal surface, a cathode, and an aqueous electrolytic solution in contact with the metal surface and in electrically conductive communication with said cathode. The electrolytic solution contains an anion comprising a polymer having a pendent moiety selected from the group consisting of phosphate, phosphonate, phosphite, phosphinate, sulfate, sulfonate, carboxylate and combinations thereof. The potential applied to said circuit is controlled at a voltage within the range of 0.5 to 20 volts and a constituent metal of the metal substrate is anodically oxidized and reacts with the anion to form a composition at said surface that imparts an enhanced property to said surface.

In a further aspect, the invention is directed to a process for treating the surface of a metal substrate comprising a constituent metal selected from the group consisting of Cr, Cu, Mn, Mo, Ag, Au, Pt, Pd, Rh, Pb, Sn, Ni, Fe, Zn and alloys thereof. An anodic potential is applied to the metal surface in an electrolytic circuit comprising the metal surface, a cathode, and an aqueous electrolytic solution in contact with said metal surface and in electrically conductive communication with the cathode. The electrolytic solution has a pH not greater than about 6.0 and contains an electrolyte comprising anions selected from the group consisting of phosphate, phosphonate, phosphite, phosphinate, nitrate, borate, silicate, molybdate, tungstate, carboxylate, oxalate and combinations thereof. The potential applied to circuit is controlled within the range between about 0.5 and about 20 volts such that the current density is between about 0.01 and about 2.0 amps/$dm^2$ of the geometric area of the metal surface in contact with said electrolytic solution, and a constituent metal of the metal substrate is anodically oxidized and reacts with the anion to form a composition at said surface that imparts an enhanced property to said surface.

The invention is still further directed to a process for treating the surface of a metal substrate comprising a constituent metal selected from the group consisting of Cr, Cu, Mn, Mo, Ag, Au, Pt, Pd, Rh, Pb, Sn, Ni, Zn and alloys thereof. An anodic potential is applied to the metal surface in an electrolytic circuit comprising the metal surface, a cathode, and an aqueous electrolytic solution in contact with the metal surface and in electrically conductive communication with the cathode. The electrolytic solution contains an electrolyte comprising anions selected from the group consisting of phosphate, phosphonate, phosphite, phosphinate, nitrate, borate, silicate, molybdate, tungstate, carboxylate, oxalate and combinations thereof. The potential applied to said circuit is controlled to cause anodic oxidation at the said metal surface, and the current density at the metal surface is controlled such that nascent cations of the constituent metal produced by anodic oxidation of the constituent metal react with said anions at the metal surface without significant formation of any oxide or hydroxide of the constituent metal.

BRIEF DESCRIPTION OF THE DRAWING

The single FIGURE of the drawing depicts a depth profile analysis as provided by glow discharge optical emission spectroscopy, showing the relative concentrations of elements contained in the nanolayer composition formed at the surface of a chromium substrate according to the process of the invention.

DESCRIPTION OF THE PREFERRED EMBODIMENTS

The electrolytic treatment process of the invention is capable of increasing the corrosion resistance of metal substrates like, for example nickel layers, copper layers, chrome layers, zinc layers, tin layers, silver layers, iron layers, manganese layers, molybdenum layers, gold layers, platinum layers, ruthenium layers, palladium layers, rhodium layers and lead layers or layers of alloys comprising at least one of the before mentioned metals, like for example Ni—P-alloy layers, brass layers, bronze layers, nickel-silver layers, coin-metal layers, or type-metal layers. Generally, the metal substrate may comprise a metal layer on another object, such as, e.g., a chromium coating on a steel object, or the outer stratum of a metal object itself.

While being mainly directed to metal layers deposited on an substrate surface, the inventive method is also capable to increase the corrosion resistance of metal surfaces in general, like for example the surfaces of substrates made of steel or stainless steel, brass, or bronze.

The solution to be used within the inventive method can be an aqueous corrosion resistance increasing solution, which means an aqueous solution comprising a compound which is capable to increase the corrosion resistance of the metal layer deposited.

Examples for such compounds increasing the corrosion resistance of layers are, for example compounds having moieties like anions of the group consisting of phosphates, phosphonates, phosphinates, nitrates, borates, silicates, molybdates, tungstates, carboxylates and oxalates.

In certain embodiments of the inventive method, the corrosion resistance increasing solution comprises a compound having hydrophobic carbon-chains with hydrophilic anionic functional groups. Such functional groups are preferably phosphate-groups, phosphonate-groups, sulphate-groups, sulphonate-groups, or carboxyl-groups. Such compounds having hydrophobic carbon-chains with a hydrophilic anionic functional group are, for example polyvinyl phosphonic acid and/or polyacrylic acid, and/or copolymers of such acids. A particularly preferred electrolyte comprises an anion that comprises repeating units derived from vinyl phosphonic acid or vinyl phosphinic acid, for example, a copolymer of vinyl phosphonic acid and (meth)acrylic acid.

Other examples for a compound having hydrophobic carbon-chains with a hydrophilic anionic functional group are alkylphosphonic acids or alkylsulfonic acids having 10 to 26 carbon atoms.

According to the inventive method, the potential applied to the circuit is such that the voltage between the cathode and the metal substrate functioning as the anode is between about 0.5 and about 20 v, preferably between about 0.5 and about 3.0 v, and the current density of the applied current can be in a range between 0.001 $A/dm^2$ and 100 $A/dm^2$ of the geometric area of the substrate that is in contact with the electrolytic solution, with a preferred range between 0.02 $A/dm^2$ and 10 $A/dm^2$. To minimize formation of a layer comprising an oxide or hydroxide of a constituent metal at the surface of the metal substrate, the current density is most preferably controlled in the lower end of these ranges. Under such conditions, if there is a natural oxide layer at the surface, its thickness is not detectably increased by the electrolytic treatment. Most preferably, the voltage and current density are controlled at levels such that nascent cations produced by anodic oxidation of a constituent metal of the substrate are reacted with the anion of the electrolytic solution at the metal surface without formation of an oxide or hydroxide. Generally, it has been found that formation of oxide or hydroxide is minimized or eliminated if the current density is controlled in the range between about 0.01 and about 2 A per $dm^2$ of the geometric area. At a current density within this range, it is in some instances possible to remove an existing natural oxide layer by oxidation and incipient dissolution of the constituent metal below the natural oxide layer, causing the oxide layer to slough off the surface of the metal.

Current can be applied for a time between 0.001 seconds and 10 minutes, preferably between 30 seconds and 3 minutes. When using a low current density within the inventive method, the time the current is applied has to be higher, for example within the range of minutes, while high current densities will needed to be applied only for short times, like for example within the range of milliseconds or seconds. It is generally preferred that the application of current be terminated after the total charge transfer is between about 0.01 and about 100 mAhr per $dm^2$ of the geometric area of the metal surface that is in contact with the electrolytic solution. More preferably, the total electric charge transfer is in the range between about 0.1 and about 10 mAhr/dm$^2$.

To facilitate control of the current density and minimize formation of anodic oxide on the substrate, it is preferred that the concentration of the anion in the solution be between about 1 and about 50 g/L, more preferably between about 1 and about 25 g/L. Conductivity of the electrolytic solution is preferably between about 1 and about 500 millisiemens. Typically, the conductivity is between about 50 and about 350 millisiemens. In some embodiments, for example, where the anion comprises a hydrophobic carbon chain, such as an anion derived from a polyelectrolyte or ionomer, or another anion having a high molecular weight hydrocarbon moiety, the conductivity is typically in the lower portion of this range, e.g., 50 to 200 millisiemens. The conductivity may be especially low where the anion is not fully dissolved in the electrolytic solution but is instead dispersed or emulsified therein. In other instances, e.g., where the anion comprises a relatively low molecular weight phosphonate or phosphinate, a relatively high conductivity is acceptable or preferable, e.g., 200 to 400 millisiemens or higher. It is also preferred that the applied potential be at the low end of the 0.5 to 20 volt range, e.g., in the 0.5 to 3.0 v range described above. Where a low molecular weight inorganic anion is used, a potential in the range of 0.5 to 2.0 volts is particularly preferred. Somewhat higher voltages have been found necessary where the anion is polymeric, and especially so where the anion is comprised by a solid particulate ionomer or polyelectrolyte dispersed in the aqueous electrolytic solution, or by a liquid ionomer or polyelectrolyte that is emulsified with the aqueous medium. In such instances, the voltage may more typically be in the range between about 2 and about 20 v, such as in the range between about 5 and about 15 v.

It is further preferred that the pH of the solution be not greater than about 9.0. In most applications, the pH is preferably not greater than about 6.0, more preferably not greater than about 5.0, most preferably between about 2.0 and about 5.0. An acid pH is particularly preferred where the electrolyte comprises a polymeric anion or the substrate is ferrous.

As noted, it is believed that by the appliance of the anodic current, the oxide layer on the metal or metal layer surface is removed, thereby enabling the corrosion resistance increasing compounds to react with the metal. In this the inventive method differs from the anodic treatment known for aluminium surfaces, where by an anodic current an oxide layer on the metal surface is formed. Application of current under the preferable controlled conditions results in the formation on the metal surface of a nanolayer comprising a composition that comprises a salt or complex of a constituent metal of the metal substrate and an anion contained in the electrolytic solution. Under proper control of voltage and current density within the ranges described above, detectable growth or formation of an oxide layer on the metal surface is avoided, and anodic oxidation causes loss of metal in a marginal substratum of the substrate at the metal surface. In a particularly preferred embodiment, no detectable oxide or hydroxide remains at the metal surface at the time passage of current in the electrolytic circuit is terminated. If the current density and voltage are balanced within the aforesaid ranges, anodic oxidation can cause a loss from the metal surface of a marginal substratum of metal having a thickness in the range of between about 0.0005 and about 0.5 μm, preferably a thickness at least equal to or exceeding the thickness of the nanolayer comprising the salt or complex of the constituent metal and an anion of the electrolytic solution.

A particular advantage of the process of the invention is the provision on the metal surface of a corrosion-resistant nanolayer having a thickness less than about 100 nm. Known corrosion-resistant coatings are often thick. If the coating is too thick or of the wrong composition, there can be problems of adherence of, e.g., a paint or varnish over the coating. Also, if the coating is too thick, the metal substrate cannot be welded properly. A major advantage of the present invention is that the process yields a passivation layer on a substrate which protects the surface against corrosion, yet is thin enough that it preserves the capability of welding the underlying metal substrate to another metal object.

According to the method of the invention, it is possible to provide a passivation layer having a thickness significantly less than 100 nm. In certain preferred embodiments of the invention, it is especially preferred that the thickness of the nanolayer be in the range between about 10 and about 50 nm, more preferably between about 10 and about 30 nm, most preferably between about 10 and about 20 nm. A particularly preferred passivation layer comprises a composition that comprises a salt or complex of tin and an anion of the electrolytic solution, most preferably, a polymer comprising a pendent moiety such as phosphate, phosphonate, phosphite, phosphinate, sulfate, sulfonate, or carboxylate.

Anodic current in the meaning of the invention is as any kind of current having an anodic portion. Therefore, not only pure anodic direct current can be applied, but also alternating current. Also, it is possible to apply the current as a pulse, like it is known from pulse or pulse-revers plating operations. Where alternating current is employed, the cathodic cycle at the surface of the metal substrate can serve a useful purpose in reducing natural oxides and/or hydroxides at the surface, thus presenting a clean metal surface for anodic reaction with the anions in the solution during the anodic phase, thereby forming on the surface the desired nanolayer composition comprising a salt or complex of a constituent metal of the substrate and an anion of the electrolytic solution.

Surprisingly, a further improvement of the above described method is found by the addition of an aromatic compound having at least one hydroxy group, like phenol or its derivates. Especially capable is the addition of an aromatic compound having at least one hydroxy group which comprises a further functional group having a positive inductive effect on the hydroxyl group.

Aromatic compounds capable to further improve the inventive methods are compounds of the general structure

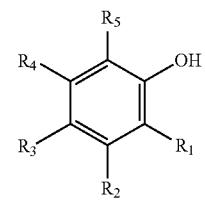

wherein R1 is H or OH; R2 is H, OH, F, Cl, Br, —O—R, R—OH, R—COOH, R—CHO, R—O—R, R—CO—R, —SH, —NO$_2$, —CN, —COO—R; and R3 to R5 are independently from each other H, $C_nH_{2n+1}$, OH, F, Cl, Br, —O—R, R—OH, R—COOH, R—CHO, R—O—R, R—CO—R, —SH, —NO$_2$, —CN, —COO—R, wherein R is an unsubstituted or substituted alkyl-group having 1 to 10 carbon.

Compounds according to the above mentioned general structure are, for example phenol, 3-ethoxyphenol, 3,5-dimethoxyphenol, 3-nitrophenol, resorcinol, 4-ethylresorcinol, 4-chlorresorcinol, phloroglucine, pyrogallol, gallic acid, catechol, dihydroxybenzaldehyde, dihydroxytoluene, 3-hydroxyphenylacetic acid, 3-hydroxybezoic acid, n-octyl gallat, guajacol and 3,5,7-trihydroxyflavone.

It was found that at least one further functional group in meta-position to the hydroxy group renders a compound according to the above mentioned general structure to be especially useful within the inventive method.

The addition of the mentioned aromatic compounds to the inventive corrosion resistance increasing solution in the inventive method surprisingly enables to reduce the concentration of the compound having hydrophobic carbon-chains with hydrophilic anionic functional groups, like polyvinyl phosphonic acid and/or polyacrylic acid, even if the aromatic compound is added only in very small amounts.

The aromatic compound can be added to the inventive corrosion resistance increasing solution in the inventive method at a concentration between 0.45 mmol and 45 mmol, with a preferred range of 2 mmol to 9 mmol.

Also when added in such a low concentration, the amount of the compound having hydrophobic carbon-chains with hydrophilic anionic functional groups can be reduced by a coefficient of at least 4 to 5. For example, instead of using 4 g/l of a polyvinyl phosphonic acid/polyacrylic acid copolymer (30/70) in absence of an aromatic compound having a hydroxy group, by addition of such an aromatic compound the concentration of the copolymer can be reduced to 1 g/l only. That gains into a reduction of the costs for the commodities used per square meter by at least four times.

While not being bound to the theory, the applicant believes that due to the anodic contacting of the metal layer, the metal layer is partly dissolved, thereby forming areas of the metal layer surface which are capable to form covalent bondings between the metal surface and the compounds used for the increase of the corrosion resistance. These effects in a very strong bonding of the compounds and/or anions on the metal surface which gains into a corrosion resistance increasing coating strongly adhered to the metal layer surface. Furthermore, due to the current applied the anions and compounds are forced to react or at least interact with the metal layer surface.

While not being bound to this theory with respect to the additionally used aromatic compounds having at least one hydroxy group, the applicant believes that the aromatic compound is bound to the metal surface by the hydroxy group in a covalent manner. One attempt to explain the reaction is that the hydroxy group, during the anodic treatment, is deprotonated offering a free valence at the oxygen of the hydroxy group. This theory can also explain the improvements gained by the use of an aromatic compound comprising in meta-position to the hydroxy group a group having a positive inductive effect. The positive inductive effect supports the deprotonation of the hydroxy group, thereby enabling the reaction pass to form a covalent binding to the metal surface.

Concerning the use of the inventive method to increase the corrosion resistance of a precious-metal layer, it is known in the art that corrosion of a composite comprising a substrate and a precious meal layer over the substrate does not necessarily involve corrosive attack on the precious-metal, but may instead involve only attack on the metal forming the layer underneath the precious-metal layer. In other instances, both substrate and precious metal layer are subject to corrosion. In general, such precious-metal layers show pores and cracks leaving open areas of the metal the precious-metal layer is deposited on, like for example nickel or copper. Attempts of the state of the art to increase the corrosion resistance of such layers in general are accompanied with an increase of the thickness of the precious-metal layer to reduce the number of pores and cracks. This boosts the amount of precious metal needed per area, thereby directly increasing the cost significantly. It is believed that when performing the inventive method to a precious-metal layer the corrosion resistance increasing compound does not bind only to the precious-metal, but as well to the metal forming the layer underneath the precious-metal layer. Accordingly, there is no need in the inventive method to increase the thickness of the precious-metal layer to achieve a surface having excellent corrosion resistance. This allows to use very thin precious-metal platings only and to reduce the costs per area in a significant manner.

A further field of application for the inventive method as well as the inventive corrosion resistance increasing solution is to prepare a metal layer for varnishing it. To varnish a metal layer by lacquer or varnish becomes more and more important in the art of surface finishing. One problem occurring when varnishing metal surfaces is the weak adhesion of the varnish or lacquer to the metal surface. Here, the inventive method and the inventive solution can be used to form a primer on the metal surface. The primer increases the adhesion of the varnish to the metal surface.

Advantageously, in the inventive method the primer can be adapted to the varnish or lacquer used. Such an adaption can be especially performed by variation of the aromatic compound having a hydroxy group comprised in the inventive post-treatment solution.

An example for such a use of the inventive method in the art of vanishing is to varnish chrome-wheels in the automotive industry. Here, for example after deposition of a chromium layer on the wheel a mask is put on the chromium surface to transfer a specific pattern to the surface by a lacquer. By appliance of the inventive method to the wheel prior to the varnishing the adhesion of the lacquer to the chromium surface is improved in a significant manner, and at the same time the corrosion resistance of the chromium layer is increased.

The invention is explained in terms of examples in the following, while not being limited to these examples only.

Example 1

FIG. 1 shows a depth analysis obtained by glow discharge optical emission spectroscopy profile on a corrosion resistant nanolayer obtained by electrolytic treatment of a chromium substrate in an electrolytic circuit comprising the chromium substrate as the anode, a cathode, and an electrolytic solution containing vinyl phosphonic acid in contact with the substrate. Glow discharge optical emission spectroscopy (GDOES) is a quantitative depth profiling technique that is suited to the chemical analysis of surface coatings. The FIGURE demonstrates the depth profile analysis a coating produced by the electrolytic treatment of this example.

The results, as illustrated in the GDOES graph demonstrate the depth analysis of the treatment process of this example. The weight percentages of carbon and phosphorus are indicated along the left ordinate and the weight percentages of chromium and oxygen are indicated along the right ordinate. These are plotted against the depth from the surface as expressed in nm along the abscissa.

From the profiles for carbon, phosphorus, oxygen and chromium shown in FIG. 1, it may be seen that the salt or complex of chromium produced by anodic oxidation of the chromium and reaction with the anion at the substrate surface is limited to a nanolayer that extends only about 10-20 nm above a level beyond which the composition of the substrate entirely prevails.

While the GDOES graph of the drawing. illustrates the passivation of a chromium (Cr) substrate, numerous other metal substrates may be protected against corrosion according to the method of the invention. These include, e.g., nickel, copper, zinc, tin, silver, iron, manganese, molybdenum, gold, platinum, ruthenium, palladium, rhodium, and lead, or an alloy comprising at least one of these metals. The process is particularly suited for providing a protective anodic layer over a non-ferrous metal such as nickel, copper, chromium, tin, silver, etc. However, it also provides an advantageous method for protecting ferrous metals without any substantial formation of an oxide layer. It is especially suitable for protection of either ferrous or non-ferrous metals at a pH <6.0, preferably less than about 5.0, more preferably in the range of between about 2.0 and about 5.0.

The process is particularly suitable for enhancing a surface property of a metal selected from among Cr, Cu, Ag, Au, Ni, P, Sn, and Zn, and alloys thereof, for example, Cr, Ag, Au, Ni and alloys thereof. It is particularly preferred that the metal substrate be substantially free of Al.

Example 1

A microporous chromium plated grill is brought into contact in a post-treatment procedure with an aqueous solution comprising 30 g/l of a polyvinyl phosphonic acid/polyacrylic acid copolymer at a temperature of 60° C. An anodic current of 0.05 A/dm$^2$ is applied between the microporous chromium plated grill and a stainless steel counter electrode for 2 minutes. The resulting layer shows a strong improvement of the corrosion resistance against $CaCl_2$ containing corrosion media in the so called "Russian Mud Test". The grill was covered with a mixture containing 10 ml water, 2 g $CaCl_2$, and 10 g Kaolin. After 168 h testing at 50° C. the surface of the chromium plated grill showed no visible corrosion attack.

Example 2

A microcracked chromium plated grill is brought into contact in a post-treatment procedure with an aqueous solution comprising 5 g/l of a polyvinyl phosphonic acid/polyacrylic acid copolymer and 5 g/l sodiumphosphate at a temperature of 60° C. An anodic current of 0.15 A/dm$^2$ is applied between the microcracked chromium plated grill and a stainless steel counter electrode for 1 minute. The resulting layer shows a strong improvement of the corrosion resistance against $CaCl_2$ containing corrosion media in the so called "Russian Mud Test". The resulting layer shows also after a treatment with solvents like acetone the same resistance against such $CaCl_2$ containing corrosion media as before.

Example 3

A hard chromium plated valve is brought into contact in a post-treatment procedure with an aqueous solution comprising 5 g/l of a polyvinyl phosphonic acid/polyacrylic acid copolymer and 5 g/l sodium metasilicate at a temperature of 80° C. An anodic current of 0.25 A/dm$^2$ is applied between the hard chromium plated valve and a stainless steel counter electrode for 1 minute. The resulting layer shows a strong improvement of the corrosion resistance in the copper accelerated salt spray test (CASS).

Example 4

A hard chromium plated valve is brought into contact in a post-treatment procedure with an aqueous solution comprising 6 g/l of a polyvinyl phosphonic acid and 5 g/l sodium metasilicate at a temperature of 80° C. An anodic current of 0.25 A/dm$^2$ is applied between the hard chromium plated valve and a stainless steel counter electrode for 1 minute. The resulting layer shows a strong improvement of the corrosion resistance in the copper accelerated salt spray test (CASS).

Example 5

A hard chromium plated valve is brought into contact in a post-treatment procedure with an aqueous solution comprising 7 g/l of a polyacrylic acid copolymer and 5 g/l sodium metasilicate at a temperature of 80° C. An anodic current of 0.25 A/dm$^2$ is applied between the hard chromium plated valve and a stainless steel counter electrode for 1 minute. The resulting layer shows a strong improvement of the corrosion resistance in the copper accelerated salt spray test (CASS).

Example 6

A steel panel first was plated with a bright nickel layer. On the nickel layer a chromium layer was deposited from a trivalent chromium electrolyte. The so plated steel panel was brought partly into contact in a post-treatment procedure with an aqueous solution comprising 2.5 g/l of an alkylphosphonic acid ($C_{18}$), 25 g/l butylglycole, 10 g/l phosphonic acid, and 0.2 g/l ethylhexylsulphate at a temperature of 60° C. An anodic current of 0.05 A/dm$^2$ is applied between the panel and a stainless steel counter electrode for 30 seconds. The resulting layer shows a strong improvement of the corrosion resistance in neutral salt spray test (NSS). The untreated area of the partly post-treated panel shows after 24 h red rust (pin hole corrosion). The post-treated area shows first red rust after 72 h NSS.

Example 7

A chromium plated bath room fitting with a dull pearl-bright finish is brought into contact in a post-treatment procedure with an aqueous solution comprising 10 g/l of a polyvinyl phosphonic acid/polyacrylic acid copolymer at a temperature of 60° C. An anodic current of 0.05 A/dm$^2$ is applied between the chromium plated bathroom fitting and a stainless steel counter electrode for 2 minutes. The resulting layer shows a surface, which is less sensitive against fingerprints in comparison to non-post-treated pearlbrite surfaces.

Example 8

A nickel and chromium plated bathroom fitting with brass as substrate was brought partly into contact in a post-treatment procedure with an aqueous solution comprising 0.5 g/l of an alkylphosphonic acid ($C_{14}$), 20 g/l butylglycole, 5 g/l benzotriazole, and 0.2 g/l ethylhexylsulphate at a temperature of 50° C. An anodic current of 0.05 A/dm$^2$ is applied between the bathroom fitting and a stainless steel counter electrode for 4 minutes. The post-treated bathroom fitting was brought into contact with artificial sweat and stored in this for 168 h. After this the Ni, Cu and Pb concentration in the artificial sweat solution, that was leached out from the bathroom fitting was 90% less than for an untreated bathroom fitting under same test conditions.

Example 9

A microporous chromium plated grill is brought into contact in a post-treatment procedure with an aqueous solution comprising 4 g/l of a polyvinyl phosphonic acid/polyacrylic acid copolymer (30/70) and 5 g/l sodium orthophosphite at a temperature of 60° C. and a pH of 3.5. An anodic current of 0.2 A/dm$^2$ is applied between the microporous chromium plated grill and a stainless steel counter electrode for 2 minutes. The resulting layer shows a strong improvement of the corrosion resistance against $CaCl_2$ containing corrosive media in the so called "Nissan-Test. For the Nissan test a mixture of kaolin, $CaCl_2$, and water is applied to the metal surface of the chromium plated grill which is stored at a temperature of 60° C. for 48 h to 168 h. After storage the visible corrosion attack caused by the applied $CaCl_2$-containing media is used to classify the corrosion resistance of the tested metal surface.

Example 10

A microporous chromium plated grill was post-treated like explained in example 7, with the difference that the aqueous solution comprises 1 g/l of a polyvinyl phosphonic acid/polyacrylic acid copolymer (30/70) only, 0.5 g/l resorcinol, and 5 g/l sodium-orthophosphite. The resulting layer had the same corrosion resistance like the layer in example 7.

Example 11

A nickel plated article for jewelry application is plated last with a bright silver layer. The so plated article is brought partly into contact in a post-treatment procedure with an aqueous solution comprising 5 g/l of polyacrylic acid, 10 g/l sodiumphosphonate, 6 g/l phosphoric acid and 1 g/l guajacol at a temperature of 60° C. An anodic current of 0.01 A/dm² is applied between the article and a stainless steel counter electrode for 5 minutes. The resulting layer shows a strong decrease of discolouration after storing it for 3 minutes in an aqueous solution comprising 3% of ammoniumsulfide.

Example 12

A chromium plated plated wheel rim is brought into contact in a post-treatment procedure with an aqueous solution comprising 2 g/l sodiumphosphite and 15 g/l of a polyvinyl phosphonic acid at 50° C. An anodic current of 1 A/dm² is applied between the chromium plated wheel rim and a stainless steel counter electrode for 15 seconds. After this time the resulting layer shows strong hydrophilic properties. Therefore a water-based lacquer or even a two-component-acrylic lacquer is easy to apply on the post-treated chromium surface and the final varnishing system shows a strong improvement of adhesion to the chromium surface.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

The invention claimed is:

1. A process for treating the surface of a non-ferrous metal substrate comprising a constituent metal selected from the group consisting of Cr, Cu, Sn, Ni, and alloys thereof, the method comprising:
applying an anodic potential to said metal surface in an electrolytic circuit comprising said metal surface, a cathode, and an aqueous electrolytic solution in contact with said metal surface and in electrically conductive communication with said cathode, said electrolytic solution containing an electrolyte comprising a compound having a hydrophobic carbon-carbon chain with hydrophilic anionic functional groups and another anion selected from the group consisting of phosphate, phosphonate, phosphite, phosphinate, nitrate, borate, silicate, molybdate, tungstate, carboxylate, oxalate and combinations thereof; and
controlling the potential applied to said circuit between about 0.5 and about 3.0 volts and the current density between about 0.01 and about 2.0 A/dm² of the geometric area of said metal surface in contact with said electrolytic solution such that a constituent metal of said substrate is anodically oxidized and reacts with said compound to form a composition at said surface that imparts an enhanced property to said surface;
wherein the current density and voltage are controlled so that said composition is formed at said surface but no detectable increase in the thickness of any layer comprising an oxide or hydroxide of any of said constituent metals occurs during passage of current in said circuit.

2. The process of claim 1 wherein the substrate is a Cr-based coating on a metal body.

3. The process as set forth in claim 1 wherein the concentration of said another anion in the electrolytic solution is between about 1 and about 50 g/L.

4. The process as set forth in claim 3 wherein the concentration of said another anion in the electrolytic solution is between about 1 and 25 g/L.

5. The process as set forth in claim 1 wherein the conductivity of the electrolytic solution is between about 1 and about 500 millisiemens.

6. The process as set forth in claim 1 wherein passage of current in said electrolytic circuit is terminated when the total electric charge transferred during formation of said composition at said surface is between about 0.05 and about 100 mAhr per dm² of the geometric area of said metal surface in contact with said electrolytic solution.

7. The process as set forth in claim 1 wherein no detectable oxide or hydroxide of any of said constituent metals remains at said surface at the time passage of current in said circuit is terminated.

8. The process as set forth in claim 1 wherein the current density is such that nascent cations produced by anodic oxidation of said constituent metal react with said anions at the metal surface without significant formation of any oxide or hydroxide of the constituent metal.

9. The process as set forth in claim 1 wherein a nanolayer comprising said composition is formed at the surface of said metal substrate.

10. The process as set forth in claim 9 wherein the thickness of said nanolayer is not greater than about 100 nm.

11. The process as set forth in claim 9 wherein anodic oxidation causes a loss of a marginal substratum of metal at the surface of said substrate, the thickness of said substratum being at least equal in thickness to said nanolayer.

12. The process as set forth in claim 11 wherein the thickness of said marginal substratum of lost metal exceeds the thickness of said nanolayer, and the thickness of the marginal substratum of lost metal is between about 0.0005 and about 0.5 µm.

13. The process as set forth in claim 1 wherein said compound having a hydrophobic carbon-carbon chain with hydrophilic anionic functional groups comprises a polymer having a pendent moiety selected from the group consisting of phosphate, phosphonate, phosphite, phosphinate, sulfate, sulfonate, carboxylate, and combinations thereof.

14. The process as set forth in claim 13 wherein the polymer comprises repeating units derived from vinyl phosphonic or vinyl phosphinic acid.

15. The process as set forth in claim 14 with the polymer comprising a copolymer of (meth)acrylic acid and vinyl phosphonic acid.

16. The process as set forth in claim 1 wherein said metal substrate is substantially free of Al.

17. The process as set forth in claim 1 any of claims 1 through 16 wherein the pH of said aqueous electrolytic solution is not greater than about 6.0.

18. The process as set forth in claim 17 wherein the pH is between about 2.0 and about 5.0.

19. The process as set forth in claim 1 wherein said enhanced property comprises enhanced corrosion resistance.

20. The process as set forth in claim 1 wherein said metal substrate comprises a metal layer on an underlying object or an outer stratum of a metal object.

21. The process of claim 1 wherein said controlling comprises controlling the current density at said surface such that nascent cations of said constituent metal produced by anodic oxidation of said constituent metal react with said compound having a hydrophobic carbon-carbon chain with hydrophilic anionic groups at the metal surface without significant formation of any oxide or hydroxide of said constituent metal.

22. The process as set forth in claim 13 wherein the polymer is substantially entirely dissolved in said aqueous electrolytic solution.

23. A process as set forth in claim 1 wherein said constituent metal comprises Cr.

24. A process as set forth in claim 1 wherein said constituent metal comprises Cu.

25. A process as set forth in claim 1 wherein said constituent metal comprises Ni.

26. A process as set forth in claim 1 wherein said constituent metal comprises Sn.

27. A process as set forth in claim 1 wherein said aqueous electrolytic solution further comprises an aromatic compound having at least one hydroxy group and which comprises a further functional group having a positive inductive effect on the hydroxyl group.

28. A process as set forth in claim 1 wherein said aqueous electrolytic solution further comprises and aromatic compound corresponding to the formula:

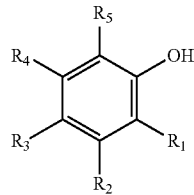

wherein R1 is H or OH; R2 is H, OH, F, Cl, Br, —O—R, R—OH, R—COOH, R—CHO, R—O—R, R—CO—R, —SH, —NO$_2$, —CN, —COO—R; and R3 to R5 are independently from each other H, $C_nH_{2n+1}$, OH, F, Cl, Br, —O—R, R—OH, R—COOH, R—CHO, R—O—R, R—CO—R, —SH, —NO$_2$, —CN, —COO—R, wherein R is an unsubstituted or substituted alkyl-group having 1 to 10 carbon.

29. A process as set forth in claim 28 wherein said aromatic compound is selected from the group consisting of phenol, 3-ethoxyphenol, 3,5-dimethoxyphenol, 3-nitrophenol, resorcinol, 4-ethylresorcinol, 4-chlorresorcinol, phloroglucine, pyrogallol, gallic acid, catechol, dihydroxybenzaldehyde, dihydroxytoluene, 3-hydroxyphenylacetic acid, 3-hydroxybezoic acid, n-octyl gallat, guajacol and 3,5,7-trihydroxyflavone.

30. A process as set forth in claim 28 wherein said aromatic compound has a further functional group in the meta-position to a hydroxy group.

31. A process for treating the surface of a non-ferrous metal substrate comprising a constituent metal selected from the group consisting of Cr, Cu, Sn, Ni, and alloys thereof, the method comprising:

applying an anodic potential to said metal surface in an electrolytic circuit comprising said metal surface, a cathode, and an aqueous electrolytic solution in contact with said metal surface and in electrically conductive communication with said cathode, said electrolytic solution containing an electrolyte comprising a compound having a hydrophobic carbon-carbon chain with hydrophilic anionic functional groups and another anion selected from the group consisting of phosphate, phosphonate, phosphite, phosphinate, nitrate, borate, silicate, molybdate, tungstate, carboxylate, oxalate and combinations thereof; and controlling the potential applied to said circuit between about 0.5 and about 3.0 volts to cause anodic oxidation at said metal surface; and controlling the current density at said surface between about 0.01 and about 2.0 A/dm$^2$ of the geometric area of said metal surface in contact with said electrolytic solution such that nascent cations of said constituent metal produced by anodic oxidation of said constituent metal react with said compound at the metal surface to form a composition at said metal surface without significant formation of any oxide or hydroxide of said constituent metal.

32. The process as set forth in claim 31 wherein the conductivity of the electrolytic solution is between about 1 and about 500 millisiemens.

33. The process as set forth in claim 32 wherein the conductivity of the electrolytic solution is between about 50 and about 350 millisiemens.

34. A process for treating the surface of a non-ferrous metal substrate comprising a constituent metal selected from the group consisting of Cr, Cu, Sn, Ni, and alloys thereof, the method comprising:

applying an anodic potential to said metal surface in an electrolytic circuit comprising said metal surface, a cathode, and an aqueous electrolytic solution in contact with said metal surface and in electrically conductive communication with said cathode, said electrolytic solution containing an electrolyte comprising a compound having a hydrophobic carbon-carbon chain with hydrophilic anionic functional groups and another anion selected from the group consisting of phosphate, phosphonate, phosphite, phosphinate, nitrate, borate, silicate, molybdate, tungstate, carboxylate, oxalate and combinations thereof; and controlling the potential applied to said circuit between about 0.5 and about 3.0 volts and the current density between about 0.01 and about 2.0 Aldm$^2$ of the geometric area of said metal surface in contact with said electrolytic solution such that a constituent metal of said substrate is anodically oxidized and reacts with said compound to form at said surface a nanolayer comprising a composition that imparts an enhanced property to said surface;

wherein the current density and voltage are controlled so that said composition is formed at said surface but no detectable increase in the thickness of any layer comprising an oxide or hydroxide of any of said constituent metals occurs during passage of current in said circuit.

35. The process as set forth in claim 34 wherein the thickness of said nanolayer is not greater than about 100 nm.

36. The process as set forth in claim 34 wherein anodic oxidation causes a loss of a marginal substratum of metal at the surface of said substrate, the thickness of said substratum being at least equal in thickness to said nanolayer.

37. The process as set forth in claim 36 wherein the thickness of said marginal substratum of lost metal exceeds the thickness of said nanolayer, and the thickness of the marginal substratum of lost metal is between about 0.0005 and about 0.5 µm.

38. A process as set forth in claim 34 wherein said constituent metal comprises Cr.

39. A process as set forth in claim 34 wherein said constituent metal comprises Cu.

40. A process as set forth in claim 34 wherein said constituent metal comprises Ni.

41. A process as set forth in claim 34 wherein said constituent metal comprises Sn.

42. A process for treating the surface of a non-ferrous metal substrate comprising a constituent metal selected from the group consisting of Cr, Cu, Sn, Ni, and alloys thereof, the method comprising:
applying an anodic potential to said metal surface in an electrolytic circuit comprising said metal surface, a cathode, and an aqueous electrolytic solution in contact with said metal surface and in electrically conductive communication with said cathode, said electrolytic solution containing an electrolyte comprising a compound having a hydrophobic carbon-carbon chain with hydrophilic anionic functional groups and another anion selected from the group consisting of phosphate, phosphonate, phosphite, phosphinate, nitrate, borate, silicate, molybdate, tungstate, carboxylate, oxalate and combinations thereof; and
controlling the potential applied to said circuit between about 0.5 and about 3.0 volts and the current density between about 0.01 and about 2.0 A/dm$^2$ of the geometric area of said metal surface in contact with said electrolytic solution such that a constituent metal of said substrate is anodically oxidized and reacts with said compound to form a composition at said surface that imparts an enhanced property to said surface, passage of current in said electrolytic circuit being terminated when the total electric charge transferred during formation of said composition at said surface is between about 0.05 and about 100 mAhr per dm$^2$ of the geometric area of said metal surface in contact with said electrolytic solution;
wherein the current density and voltage are controlled so that said composition is formed at said surface but no detectable increase in the thickness of any layer comprising an oxide or hydroxide of any of said constituent metals occurs during passage of current in said circuit.

43. A process as set forth in claim 42 wherein wherein the conductivity of the electrolytic solution is between about 1 and about 500 millisiemens.

44. The process as set forth in claim 43 wherein the conductivity of the electrolytic solution is between about 50 and about 350 millisiemens.

45. A process for treating the surface of a non-ferrous metal substrate comprising a constituent metal selected from the group consisting of Cr, Cu, Sn, Ni, and alloys thereof, the method comprising:
applying an anodic potential to said metal surface in an electrolytic circuit comprising said metal surface, a cathode, and an aqueous electrolytic solution in contact with said metal surface and in electrically conductive communication with said cathode, said electrolytic solution containing an electrolyte comprising a polymer comprising repeat units selected from the group consisting of vinyl phosphate and vinyl and phosphinate; and
controlling the potential applied to said circuit between about 0.5 and about 3.0 volts and the current density between about 0.01 and about 2.0 A/dm$^2$ of the geometric area of said metal surface in contact with said electrolytic solution such that a constituent metal of said substrate is anodically oxidized and reacts with said compound to form a composition at said surface that imparts an enhanced property to said surface;
wherein current density and voltage are controlled so that said composition is formed at said surface but no detectable increase in the thickness of any layer comprising an oxide or hydroxide of any of said constituent metals occurs during passage of current in said circuit.

46. A method as set forth in claim 45 wherein the polymer comprises repeating units derived from vinyl phosphonic or vinyl phosphinic acid.

47. The process as set forth in claim 46 comprising a copolymer of (meth)acrylic acid and vinyl phosphonic acid.

48. A process for treating the surface of a non-ferrous metal substrate comprising a constituent metal selected from the group consisting of Cr, Cu, Sn, Ni, and alloys thereof, the method comprising:
applying an anodic potential to said metal surface in an electrolytic circuit comprising said metal surface, a cathode, and an aqueous electrolytic solution in contact with said metal surface and in electrically conductive communication with said cathode, said electrolytic solution containing an electrolyte containing between about 1 and about 50 g/L of an anion comprising a polymer having a pendent moiety selected from the group consisting of phosphate, phosphonate, phosphite, phosphinate, nitrate, borate, silicate, molybdate, tungstate, carboxylate, oxalate and combinations thereof; and
controlling the potential applied to said circuit between about 0.5 and about 3.0 volts and the current density between about 0.01 and about 2.0 A/dm$^2$ of the geometric area of said metal surface in contact with said electrolytic solution such that a constituent metal of said substrate is anodically oxidized and reacts with said compound to form a composition at said surface that imparts an enhanced property to said surface;
wherein the current density and voltage are controlled so that said composition is formed at said surface but no detectable increase in the thickness of any layer comprising an oxide or hydroxide of any of said constituent metals occurs during passage of current in said circuit.

49. A method as set forth in claim 48 wherein the concentration of said another anion in the electrolytic solution is between about 1 and 25 g/L.

50. A process as set forth in claim 49 wherein the conductivity of the electrolytic solution is between about 50 and about 350 millisiemens.

* * * * *